US012132265B2

(12) United States Patent
Pelletti et al.

(10) Patent No.: US 12,132,265 B2
(45) Date of Patent: Oct. 29, 2024

(54) META-STRUCTURE ANTENNA ARRAY

(71) Applicant: Pivotal Commware, Inc., Bothell, WA (US)

(72) Inventors: Chiara Pelletti, Palo Alto, CA (US); Maha Achour, Palo Alto, CA (US)

(73) Assignee: Pivotal Commware, Inc., Bothell, WA (US)

( * ) Notice: Subject to any disclaimer, the term of this patent is extended or adjusted under 35 U.S.C. 154(b) by 51 days.

(21) Appl. No.: 17/948,438

(22) Filed: Sep. 20, 2022

(65) Prior Publication Data

US 2023/0013662 A1 Jan. 19, 2023

Related U.S. Application Data

(63) Continuation of application No. 16/363,817, filed on Mar. 25, 2019, now Pat. No. 11,450,953.

(60) Provisional application No. 62/647,822, filed on Mar. 25, 2018.

(51) Int. Cl.

| | |
|---|---|
| ***H01Q 21/00*** | (2006.01) |
| ***H01Q 3/26*** | (2006.01) |
| ***H01Q 3/32*** | (2006.01) |
| ***H01Q 3/36*** | (2006.01) |

(52) U.S. Cl.

CPC ............. *H01Q 3/2641* (2013.01); *H01Q 3/32* (2013.01); *H01Q 3/36* (2013.01); *H01Q 21/005* (2013.01)

(58) Field of Classification Search

CPC .......... H01Q 3/2641; H01Q 3/32; H01Q 3/36; H01Q 21/005

See application file for complete search history.

(56) References Cited

U.S. PATENT DOCUMENTS

| | | | |
|---|---|---|---|
| 6,043,790 | A | 3/2000 | Derneryd et al. |
| 6,492,949 | B1 | 12/2002 | Breglia et al. |
| 7,250,908 | B2 | 7/2007 | Lee |
| 7,405,698 | B2 | 7/2008 | de Rochemont |
| 7,928,900 | B2 | 4/2011 | Fuller et al. |
| 8,633,866 | B2 | 1/2014 | Sarabandi et al. |
| 8,715,839 | B2 | 5/2014 | de Rochemont |
| 8,803,739 | B2 | 8/2014 | Rajgopal et al. |
| 8,952,858 | B2 | 2/2015 | de Rochemont |
| 9,545,923 | B2 | 1/2017 | Casse et al. |
| 9,905,928 | B2 | 2/2018 | de Rochemont |
| 2007/0152868 | A1 | 7/2007 | Schoebel |
| 2011/0175789 | A1 | 7/2011 | Lee et al. |
| 2014/0375525 | A1 | 12/2014 | Shi |
| 2015/0022421 | A1 | 1/2015 | Vigano et al. |
| 2015/0229028 | A1 | 8/2015 | Bily et al. |
| 2016/0011307 | A1 | 1/2016 | Casse et al. |
| 2016/0013531 | A1 | 1/2016 | Casse et al. |

OTHER PUBLICATIONS

D. Patron, "Compact Reconfigurable Antennas for Wireless Systems and Wearable Applications," Ph.D. dissertation, Dept. of Electrical and Computer Eng., Drexel University, Philadelphia, PA, May 2015.

(Continued)

*Primary Examiner* — Dieu Hien T Duong

(74) *Attorney, Agent, or Firm* — PCFB, LLC; Justin K. Flanagan

(57) ABSTRACT

Examples disclosed herein relate to methods and apparatuses for an antenna structure having reactance control of an array of radiating elements to achieve radiation beam tilting.

13 Claims, 8 Drawing Sheets

(56) References Cited

OTHER PUBLICATIONS

Rohde & Schwarz, "Millimeter-Wave Beamforming: Antenna Array Design Choices & Characterization," Version 2e, pp. 1-28, Oct. 28, 2016.

Mojtaba Moeini-Fard et al., "Transmit Array Antenna Using Non-uniform Dielectric Layer," Science Publisher Group, Advances in Wireless Communications and Networks, pp. 23-28, 2017.

Antenna Arrays: A Computational Approach, by Randy L. Haupt. Chapter 7, "Array Beamforming Networks," Copyright 2010 John Wiley & Sons, Inc., pp. 401-463.

X. Gu et al., "A multilayer organic package with 64 dual-polarized antennas for 28GHz 5G communication," 2017 IEEE MTT-S International Microwave Symposium (IMS), Honololu, HI, pp. 1899-1901, Jun. 2017.

G.H. Huff, et al. , "Reconfigurable Antennas," in Frontiers in Antennas Next Generation Design & Engineering, New York, NY, McGraw Hill, ch. 7, pp. 271-303, 2011.

C. Balanis, et al. , "Antenna Arrays and Diversity Technology," in Introduction to Smart Antennas, 1st ed., San Rafael, CA, USA: Morgan & Claypool Publishers, Ch. 3, pp. 21-31, 2007.

L.-Y. Ji et al., "A reconfigurable beam-scanning partially reflective surface (PRS) antenna," 2015 9th European Conference on Antennas and Propagation (EuCAP), Lisbon, pp. 1-3, Apr. 2015.

E. A. Firouzjael, "mm-Wave Phase Shifters and Switches," Technical Report, No. UCB/EECS-2010-163, pp. 1-103, Electrical Engineering and Computer Sciences University of California at Berkeley, Berkeley, California, United States, Dec. 16, 2010.

H. Zhou et al., "Evolution of Satellite Communication Antennas on Mobile Ground Terminals," International Journal of Antennas and Propagation, vol. 2015, Jul. 2015.

S. J. Franson et al., "Gigabit per Second Data Transfer in High-Gain Metamaterial Structures at 60 GHz," in IEEE Transactions on Antennas and Propagation, vol. 57, No. 10, pp. 2913-2925, Oct. 2009.

I. Montesinos et al., "GEODA: Conformal adaptive antenna of multiple planar arrays for satellite communications," IEEE Antennas and Propagation Society International Symposium, Jul. 2008.

C. Balanis, et al. , "Smart Antenna," in Introduction to Smart Antennas, 1st ed., San Rafael, CA, USA: Morgan & Claypool Publishers, Ch. 4, pp. 31-67, 2007.

C. A. Allen et al., "Leaky-waves in a metamaterial-based two-dimensional structure for a conical beam antenna application," 2004 IEEE MTT-S International Microwave Symposium Digest (IEEE Cat. No. 04CH37535), vol. 1, pp. 305-308, 2004.

J.Y. Lau, "Reconfigurable Transmitarray Antennas," Ph.D. dissertation, Dept. of Electrical and Computer Eng., Univ. of Toronto, Toronto, Canada, 2012.

L. Boccia, et al., "Multilayer Antenna-Filter Antenna for Beam-Steering Transmit-Array Applications," IEEE Trans. on Microwave Theory and Techniques, vol. 60, No. 7, pp. 2287-2300, Jul. 2012.

M.W. Rousstia, "Switched-beam antenna array design for millimeter-wave applications," Eindhoven University of Technology (TU/e), Stan Ackermans Institute (SAI), Information and Communication Technology (ICT) , Eindhoven, pp. 1-183, Aug. 2011.

J. Schoebel, et al., "Planar Antenna Technology for mm-Wave Automotive Radar, Sensing, and Communications," Radar Technology, Book edited by: Dr. Guy Kouemou, ISBN 978-953-307-029-2, In Tech, Ch 15, pp. 298-319, Jan. 2010.

S. Bildik et al., "Reconfigurable Folded Reflectarray Antenna Based Upon Liquid Crystal Technology," in IEEE Transactions on Antennas and Propagation, vol. 63, No. 1, pp. 122-132, Jan. 2015.

John Huang et al, "Reflectarray Antenna," IEEE Antennas and Propagation Society, IEEE Press. Published by John Wiley & Sons, Inc. Hoboker, New Jersey, Ch. 1, pp. 1-7, 2008.

Sandra Costanzo et al., "Reflectarray Antennas: Analysis and Synthesis Techniques", International Journal of Antennas and Propagation, vol. 2012, Article ID 945682, 3 pages, 2012.

A.H. Abdelrahman, et al., "Transmission Phase Limit of Multilayer Frequency-Selective Surfaces for Transmitarray Designs," IEEE Trans. on Antennas and Propagation, vol. 62, No. 2, pp. 690-697, Feb. 2014.

C. Tripon-Canseliet, et al., "Contribution of MetaMaterials to Improvement of Scan Performance and Reconfigurability of Phased Array Antennas," International Radar Conference, Lille, France, pp. 1-3, Oct. 2014.

META-STRUCTURE ANTENNA ARRAY

CROSS-REFERENCE TO RELATED APPLICATIONS

This application is a continuation of U.S. patent application Ser. No. 16/363,817, filed Mar. 25, 2019, which claims priority to U.S. Provisional Application No. 62/647,822, filed Mar. 25, 2018, all of which are incorporated herein by reference in their entirety.

FIELD OF THE INVENTION

The present invention relates to wireless systems, and specifically to radiating elements and structures, including meta-structures and metamaterials.

BACKGROUND

In a wireless transmission system, such as radar or cellular communications, the size of the antenna is determined by the transmission characteristics. With the widespread application of wireless applications, the footprint and other parameters allocated for a given antenna, or radiating structure, are constrained. In addition, the demands on the capabilities of the antenna continue to increase, such as increased bandwidth, finer control, increased range and so forth. The present inventions provide power antenna structures to meet these and other goals.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

The present inventions described herein provide antenna meta-structures having meta-structure elements and array, wherein in some embodiments, the meta-structure elements are metamaterial elements. Sensors are used for a variety of applications, including smart mobile devices, automotive systems, industrial control, healthcare, scientific exploration, monitoring and so forth, to mimic the operation of a human being. A sensor fusion module is adapted to receive information from various, different type sensors and accumulate and combine the individual data to determine a more accurate and reliable view of the sensed environment. The sensor fusion module enables much greater control of a system than may be capable with a single type sensor. This provides context awareness using remote computing placing the computing at a position where high amounts of data may be processed. Just as a human being uses sensory inputs and detections to control functions of the body, so the sensor fusion uses the sensor inputs to control operation of a system. The goal in developing a control model for a machine, therefore, requires identification of the sensors to use and how to combine their data to find a result that closely matches the environment.

In some systems, machine learning is used to determine the object detected or sensed by a given sensor or group of sensors. The machine learning bases its function on patterns of data input to output. Machine learning is based on algorithms that rely on patterns, where the computer builds a model, such as a mathematical model, of sample data, referred to as training data, to make predictions or decisions without explicitly programming to perform the identification or task. The computer learns from sets of input-to-desired output pairs and converges on a configuration that will predict outcomes based on new inputs that were not part of the training set. Some machine learning techniques that have proved useful in pattern recognition are neural networks ("NN") and convolutional neural networks ("CNN"), in particular. These networks arrange inputs to outputs with multiple inner layers with effective connections similar to a biological brain. The connections between neurons are weighted according to training. Where the NN has multiple hidden layers, the process is referred to as deep learning. One type of deep learning is a CNN, which is designed to reduce processing where a convolutional operation is applied to the input data and passed to a next layer; these are useful in object recognition and classification. The present inventions consider a variety of machine learning methods.

Figure 1:
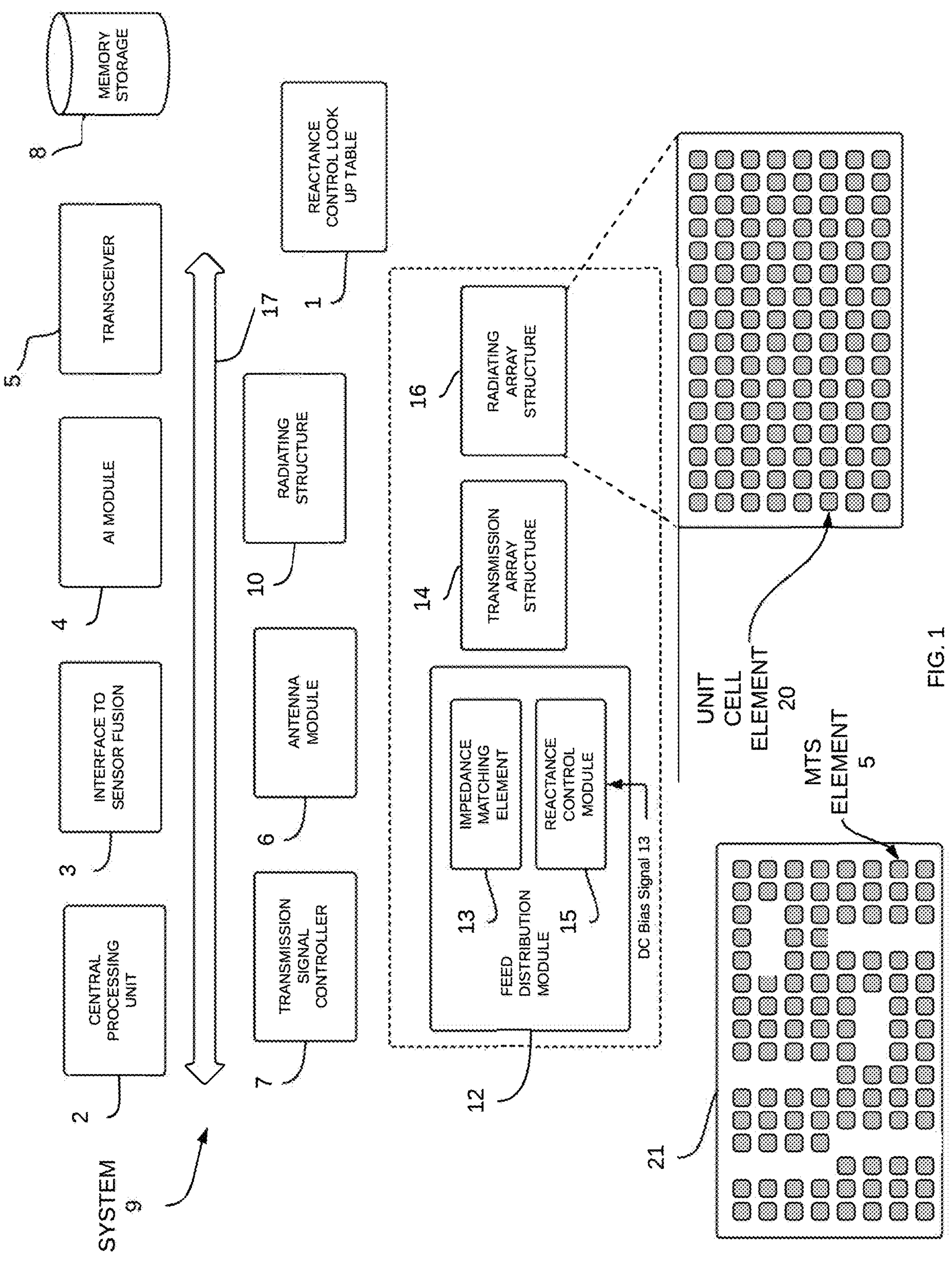
FIG. 1 illustrates an antenna system, according to embodiments of the present invention.

In an embodiment illustrated in FIG. 1, a system 9 is adapted to generate signals for an electromagnetic system, such as a radar system for a vehicle. The radar signal is used to detect and identify objects in the path and environment of a vehicle. In some embodiments, the antenna systems, radar systems and detection and identification methods are used to provide driver assist signals and information, such as in an Automated Driver Assist System ("ADAS"). Alternate applications include machinery, avionics and so forth, where the ability to detect objects in the path of the machine is needed. These applications incorporate transceiver functionality and antennas, typically with one or more antenna arrays used for transmissions while another one or more antenna arrays used for receiving signals, such as echoes from the radar signals. The use of an antenna array involves power divider circuitry to provide one or more signals to the antenna unit for transmission over-the-air.

In radar systems, the purpose is to transmit a signal of known parameters and determine a range, or distance, to an object, or target, as well as movement information, such as displacement from a position at a given time along with a trajectory over time. In some embodiments, a radar unit can also provide acceleration information, with a radar cross-sectional area indicating a size of the object, a reflectivity of the object and so forth. From this information, a classification engine is used to identify the object as a person, car, bicycle and so forth.

The present inventions are described in the context of an antenna system 9, illustrated in FIG. 1. This example is not meant to be limiting, but rather to provide a full example of the application of the present inventions. In the present example, the system 9 is positioned within a vehicle to comprehend the environment in which the vehicle is operating. In this way, the size, cost, power consumption, latency, footprint and so forth determine application for use in a particular vehicle. These and other dimensions and parameters may be customized according to the use case.

System 9 includes central processing capability, electromagnetic radiation capability and object detection capability. A central processing unit 2 may be resident with the sensor portion, radiating structure 10, of the system 9 or may be positioned in a central location on the vehicle. The central processing unit 2 is adapted to control operation of the radiating structure 10 through transmission signal controller 7 and antenna module or antenna controller 6. During this processing, information and data are processed through AI module 4 and stored in memory storage 8. The system 9 communicates with a sensor fusion unit through interface 3. The sensor fusion unit is a controller, such as a software stack, designed to intelligently combine data from various sensors to control and improve operation and performance of a machine, such as a vehicle. Combining data from the various sensors has the potential to avoid deficiencies and inaccuracies of a single or individual sensor. The sensor fusion unit also captures information according to each sensor's capabilities. Detection information and classification information may be provided through interface 3. The artificial intelligence ("AI") module 4 receives data as input and processes this through a perception engine, such as a neural network or other engine incorporating machine learning. The outputs of the AI module 4 give detailed information as to the targets/objects detected. The AI module 4 may be a CNN adapted to train on labelled data identifying objects in a scenario. This data is then used with the corresponding radar, or other sensor information, that was generated in such an environment.

The antenna system 9 includes modules and functionality to operate and respond to the antenna signals. These modules for control of reactance, phase and signal strength of transmission from an antenna, and consider a power divider circuit, and so forth, along with a control circuit therefor. The feed distribution module 12 is a corporate feed where a feed signal, or signals, is provided to multiple paths for a radiating array of elements. The feed distribution module 12 may take a variety of configurations and positions. The feed distribution module 12 may be planar with the radiating array structure or may be parallel to the radiating array structure and so forth. The feed distribution module 12 is a combination of transmission lines through which a signal propagates to the radiating array structure 16 and the transmission array structure 14. The feed distribution module 12 includes a reactance control element or module ("RCM") 15, which may be a variable capacitor, wherein the RCM 15 is adapted to change the reactance of a transmission circuit and thereby control the characteristics of the signal propagating through the transmission line. In some embodiments, the RCM 15 is a varactor, a network of varactors, or other phase shifting circuitry that changes the phase of a propagating signal. In other embodiments, alternate control mechanisms are used.

For structures incorporating a dielectric substrate to form a transmission path, such as a Substrate Integrated Waveguide ("SIW"), the RCM 15 may be integrated into the transmission line by inserting a microstrip or strip line portion that will support the reactance control module 15. Where there is such an interruption in the transmission line, a transition is made to maintain signal flow in the same direction. Similarly, the RCM 15, or reactance control structure, may require a control signal, such as a DC bias line 13 or other control means, to enable the system to control and adjust the reactance of the transmission line. In some embodiments, reactance control alters a capacitance of the transmission path and/or elements 20 of a radiating array structure 16, and in others changes inductance, and so forth. To isolate the control signal from the transmission signal, embodiments of the present invention include a resonant controller that acts to isolate the control signal from the transmission signal. In the case of an antenna transmission structure, the resonant controller isolates the DC control signal from the AC transmission signal.

The present inventions are applicable in wireless communication and radar applications, and in particular in Meta-Structure ("MSM") and Metamaterial ("MTM") structures capable of manipulating electromagnetic waves using engineered radiating structures. Additionally, the present inventions provide methods and apparatuses for generating wireless signals, such as radar signals, having improved directivity, and reduced undesired radiation patterns aspects, such as side lobes. The present inventions provide antennas with unprecedented capability of generating Radio Frequency ("RF") waves for radar systems. These inventions provide improved sensor capability and support autonomous driving by providing one of the sensors used for object detection.

The present inventions provide smart active antennas with unprecedented capability of manipulating RF waves to scan an entire environment in a fraction of the time of current systems. The present invention provides smart beam steering and beam forming using MTM radiating structures in a variety of configurations, wherein electrical changes to the antenna are used to achieve phase shifting and adjustment thereby reducing the complexity and processing time and enabling fast scans of up to approximately a 360° field of view for long range object detection.

The present invention also supports a feed structure having a plurality of transmission lines configured with discontinuities within a conductive material and having a lattice structure of unit cell radiating elements proximate the transmission lines. The feed structure includes a coupling module for providing an input signal to the transmission lines, or a portion of the transmission lines. The present embodiments illustrate the flexibility and robust design of the present invention in antenna and radar design. In some embodiments, the coupling module is a power divider structure that divides the signal among the plurality of transmission lines, wherein the power may be distributed equally among the N transmission lines or may be distributed according to another scheme, wherein the N transmission lines do not all receive a same signal strength.

The feed structure may include impedance matching elements coupled to the transmission array structure. In some embodiments, the impedance matching element incorporates a reactance control element to modify a capacitance of the radiating array structure. The impedance matching element may be configured to match the input signal parameters with radiating elements, and therefore, there are a variety of configurations and locations for this element, which may include a plurality of components.

In an example embodiment, the impedance matching element includes a directional coupler having an input port to each of adjacent transmission lines. The adjacent transmission lines and the impedance matching element form a super element, wherein each adjacent transmission line pair has a specific phase difference, such as a 90-degree phase difference with respect to each other.

As described in the present invention, a reactance control mechanism is incorporated to adjust the effective reactance of a transmission line and/or a radiating element fed by a transmission line. Such a reactance control mechanism may be a varactor diode having a bias voltage applied by a controller. The varactor diode acts as a variable capacitor when a reverse bias voltage is applied. As used herein, the reverse bias voltage is also referred to herein as a reactance control voltage or varactor voltage. The value of the reactance, which in this case is a capacitance, is a function of the reverse bias voltage value. By changing the reactance control voltage, the capacitance of the varactor diode is changed over a given range of values. Alternate embodiments may use alternate methods for changing the reactance, which may be electrically or mechanically controlled. In some embodiments of the present invention, a varactor diode may also be placed between conductive areas of a radiating element. With respect to the radiating element, changes in varactor voltage produce changes in the effective capacitance of the radiating element. The change in effective capacitance changes the behavior of the radiating element and in this way the varactor may be considered as a tuning element for the radiating elements in beam formation.

The reactance control mechanism enables control of the reactance of a fixed geometric transmission line. One or more reactance control mechanisms may be placed within a transmission line. Similarly, reactance control mechanisms may be placed within multiple transmission lines to achieve a desired result. The reactance control mechanisms may have individual controls or may have a common control. In some embodiments, a modification to a first reactance control mechanism is a function of a modification to a second reactance control mechanism.

These inventions support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. The sensor performance is also enhanced with these structures, enabling long-range and short-range visibility to the controller. In an automotive application, short-range is considered within 30 meters of a vehicle, such as to detect a person in a cross walk directly in front of the vehicle; and long-range is considered to be 250 meters or more, such as to detect approaching cars on a highway. These inventions provide automotive radars capable of reconstructing the world around them and are effectively a radar “digital eye,” having true 3D vision and capable of human-like interpretation of the world.

In some embodiments, a radar system steers a highly-directive RF beam that can accurately determine the location and speed of road objects. These inventions are not prohibited by weather conditions or clutter in an environment. The present inventions use radar to provide information for 2D image capability as they measure range and azimuth angle, providing distance to an object and azimuth angle identifying a projected location on a horizontal plane, respectively, without the use of traditional large antenna elements.

The present invention provides methods and apparatuses for radiating structures, such as for radar and cellular antennas, and provide enhanced phase shifting of the transmitted signal to achieve transmission in the autonomous vehicle range, which in the US is approximately 77 GHz and has a 5 GHz range, specifically, 76 GHz to 81 GHz, reduce the computational complexity of the system, and increase the transmission speed. The present invention accomplishes these goals by taking advantage of the properties of hexagonal structures coupled with novel feed structures. In some embodiments, the present invention accomplishes these goals by taking advantage of the properties of MTM structures coupled with novel feed structures.

Metamaterials derive their unusual properties from structure rather than composition and they possess exotic properties not usually found in nature. The metamaterial antennas may take any of a variety of forms, some of which are described herein for comprehension; however, this is not an exhaustive compilation of the possible embodiments of the present invention.

In FIG. 1, the transmission signal controller 7 generates the specific transmission signal, such as a Frequency Modulated Continuous Wave (“FMCW”) signal, which is used for radar sensor applications as the transmitted signal is modulated in frequency, or phase. The FMCW signal enables the radar to measure range to an object by measuring the phase differences in phase or frequency between the transmitted signal and the received signal, or the reflected signal. Other modulation types may be incorporated according to the desired information and specifications of a system and application. Within FMCW formats, there are a variety of modulation patterns that may be used within FMCW, including triangular, sawtooth, rectangular and so forth, each having advantages and purposes. For example, sawtooth modulation may be used for large distances to a target; a triangular modulation enables use of the Doppler frequency, and so forth. The received information is stored in a memory storage unit 8, wherein the information structure may be determined by the type of transmission and modulation pattern.

The transmission signal controller 7 may generate a cellular modulated signal, such as an Orthogonal Frequency Division Multiple (“OFDM”) signal. The transmission feed structure may be used in a variety of systems. In some systems, the signal is provided to the system 9 and the transmission signal controller 7 may act as an interface, translator or modulation controller, or otherwise as required for the signal to propagate through a transmission line system.

The present invention is described with respect to a radar system, where the radiating structure 16 is a transmission array-fed radiating array, where the signal radiates through slots in the transmission array 14 to the radiating array of MTM elements that radiate a directional signal.

In some embodiments, a reactance control element includes a capacitance control mechanism controlled by antenna module or controller 6, which may be used to control the phase of a radiating signal from radiating array structure 16. In operation, the antenna controller 6 receives information from other modules in system 9 indicating a next radiation beam, wherein a radiation beam may be specified by parameters such as beam width, transmit angle, transmit direction and so forth. The antenna controller 6 determines a voltage matrix to apply to the reactance control mechanisms coupled to the radiating structure 16 to achieve a given phase shift or other parameters. In these embodiments, the radiating array structure 16 is adapted to transmit a directional beam without using digital beam forming methods, but rather through active control of the reactance parameters of the individual elements that make up the array. Transceiver 5 prepares a signal for transmission, such as a signal for a radar device, wherein the signal is defined by modulation and frequency. The signal is received by each element of the radiating structure 16 and the phase of the radiating array structure 16 is adjusted by the antenna controller 6. In some embodiments, transmission signals are received by a portion, or subarray, of the radiating array structure 16. These radiating array structures 16 are applicable to many applications, including radar and cellular antennas. The present embodiments consider application in autonomous vehicles as a sensor to detect objects in the environment of the car. Alternate embodiments may use the present inventions for wireless communications, medical equipment, sensing, monitoring, and so forth. Each application type incorporates designs and configurations of the elements, structures and modules described herein to accommodate their needs and goals.

In system 9, a signal is specified by antenna controller 6, which may be in response to AI module 4 from previous signals, or may be from the interface to sensor fusion 3, or may be based on program information from memory storage unit 8. There are a variety of considerations to determine the beam formation, wherein this information is provided to antenna controller 6 to configure the various elements of radiating array structure 16, which are described herein. The transmission signal controller 7 generates the transmission signal and provides same to feed distribution module 12, which provides the signal to transmission array structure 14 and radiating array structure 16.

As illustrated, radiating structure 10 includes the radiating array structure 16, composed of individual radiating elements discussed herein. The radiating array structure 16 may take a variety of forms and is designed to operate in coordination with the transmission array structure 14, wherein individual radiating elements 20 correspond to elements within the transmission array structure 14. As illustrated, the radiating array structure is an 8×16 array of unit cell elements 20, wherein each of the unit cell elements 20 has a uniform size and shape; however, some embodiments incorporate different sizes, shapes, configurations and array sizes. When a transmission signal is provided to the radiating structure 16, such as through a coaxial cable or other connector, the signal propagates through the feed distribution module 12 to the transmission array structure 14 and then to radiating array structure 16 for transmission through the air.

The impedance matching element 13 and the reactance control element 15 may be positioned within the architecture of feed distribution module 12; one or both may be external to the feed distribution module for manufacture or composition as an antenna or radar module. The impedance matching element 13 works in coordination with the reactance control element 15 to provide phase shifting of the radiating signal(s) from radiating array structure 16. The present invention is a dramatic contrast to the traditional complex systems incorporating multiple antennas controlled by digital beam forming. The present invention increases the speed and flexibility of conventional systems, while reducing the footprint and expanding performance.

In the embodiment of FIG. 1, a reactance control Look-Up Table ("LUT") 1 stores values for the reactance control module 15 mapped to beam-steering operation. These may be voltages for control of module 15 that result in a phase shift from one or more radiating elements that results in a specific radiation beam in a desired direction. In other embodiments, control mappings may be based on operation of other portions of system 9, such as feedback from a received signal or information or instruction from a sensor fusion module through interface to sensor fusion 3, which may include information from an edge sensor fusion or an early sensor fusion module that control operation in a defined section of a vehicle or machine.

Figure 2:
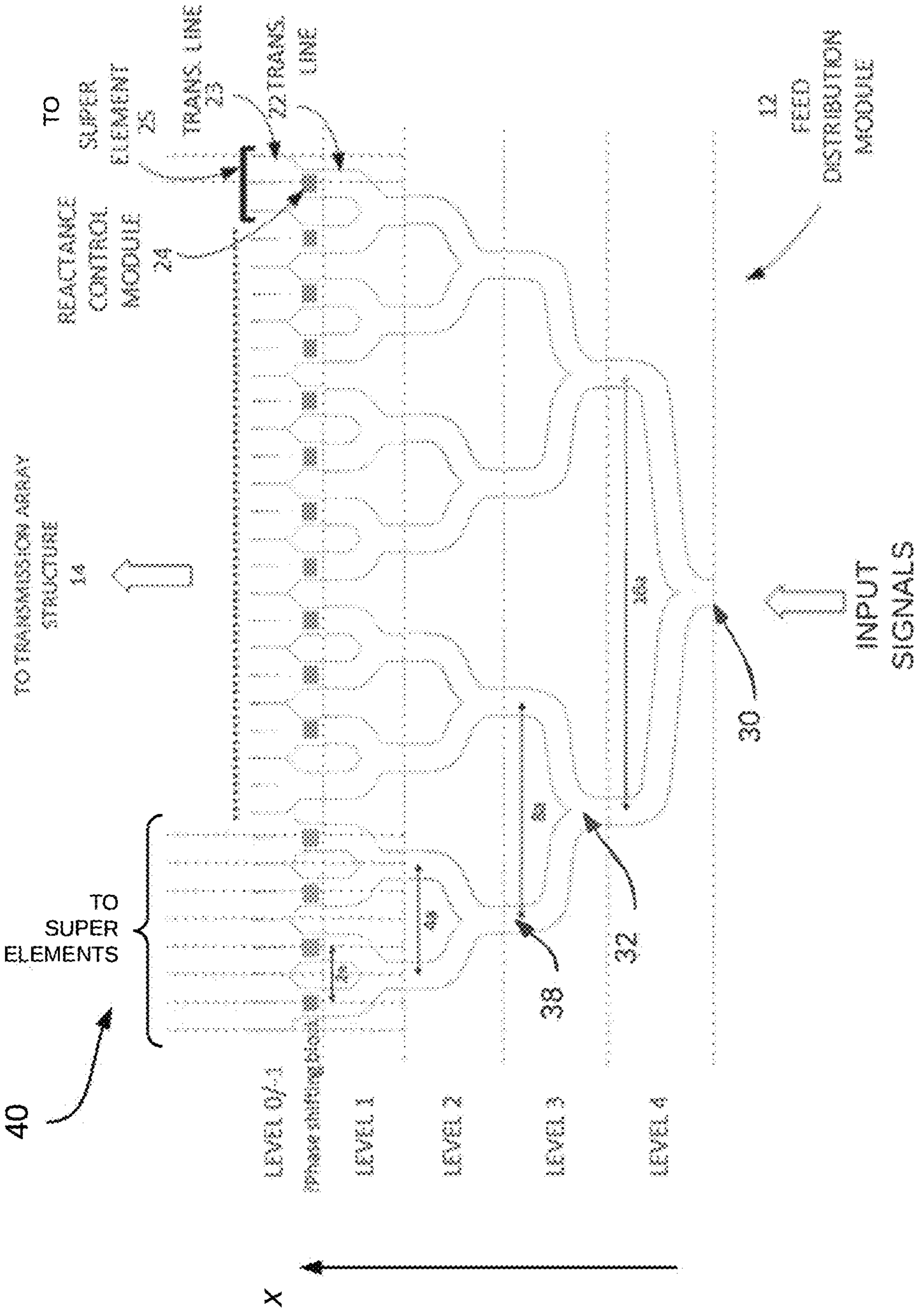
FIG. 2 illustrates a corporate feed for a transmission line array, such as for a radiating structure according to embodiments of the present invention.

FIG. 2 illustrates a perspective view of one embodiment of feed distribution module 12 coupled to transmission array structure 14, which feeds radiating array structure 16. The feed distribution module 12 extends and couples to the transmission array structure 14. The radiating array structure 16 of this embodiment is configured as a lattice of unit cells radiating elements (e.g., as shown in FIG. 1). The unit cells are MTM artificially engineered conductive structures that act to radiate and/or receive the transmission signal. The lattice structure is positioned proximate the transmission line array structure 14 such that the signal fed into the transmission lines of the array structure 14 are received at the lattice.

The feed distribution module 12 shown in FIG. 2 may be a power divider circuit. The input signal is fed in through the various paths in the circuit. This configuration is an example and is not meant to be limiting. Each of the division points belongs to a given level of division. The feed distribution module 12 receives the input signal, which propagates to the transmission array structure 14. The size of the paths may be configured to achieve a desired transmission and/or radiation result. In the present example, the path 22 of LEVEL 1, includes a reactance control mechanism 24, which changes the reactance of the path (also referred to as a transmission line) resulting in a change to the signal propagating through that path. The reactance control mechanism 24 is incorporated into path 22, but may be coupled to the path in a variety of ways. As illustrated, the other paths of LEVEL 1 have reactance control mechanisms that may be the same as mechanism 24.

The transmission lines 22 and 23 are formed in the substrate of the radiating structure 16. Transmission line 23 is a part of super element 25 that includes two transmission lines. The reactance control module 24 is configured on a microstrip within transmission line structure 22 and is illustrated in detail in FIGS. 3-5. Note, the placement of the reactance control module 24 may be positioned between transmission lines 22 and 23 or may be positioned otherwise within the paths leading to super element 25.

Figure 3:
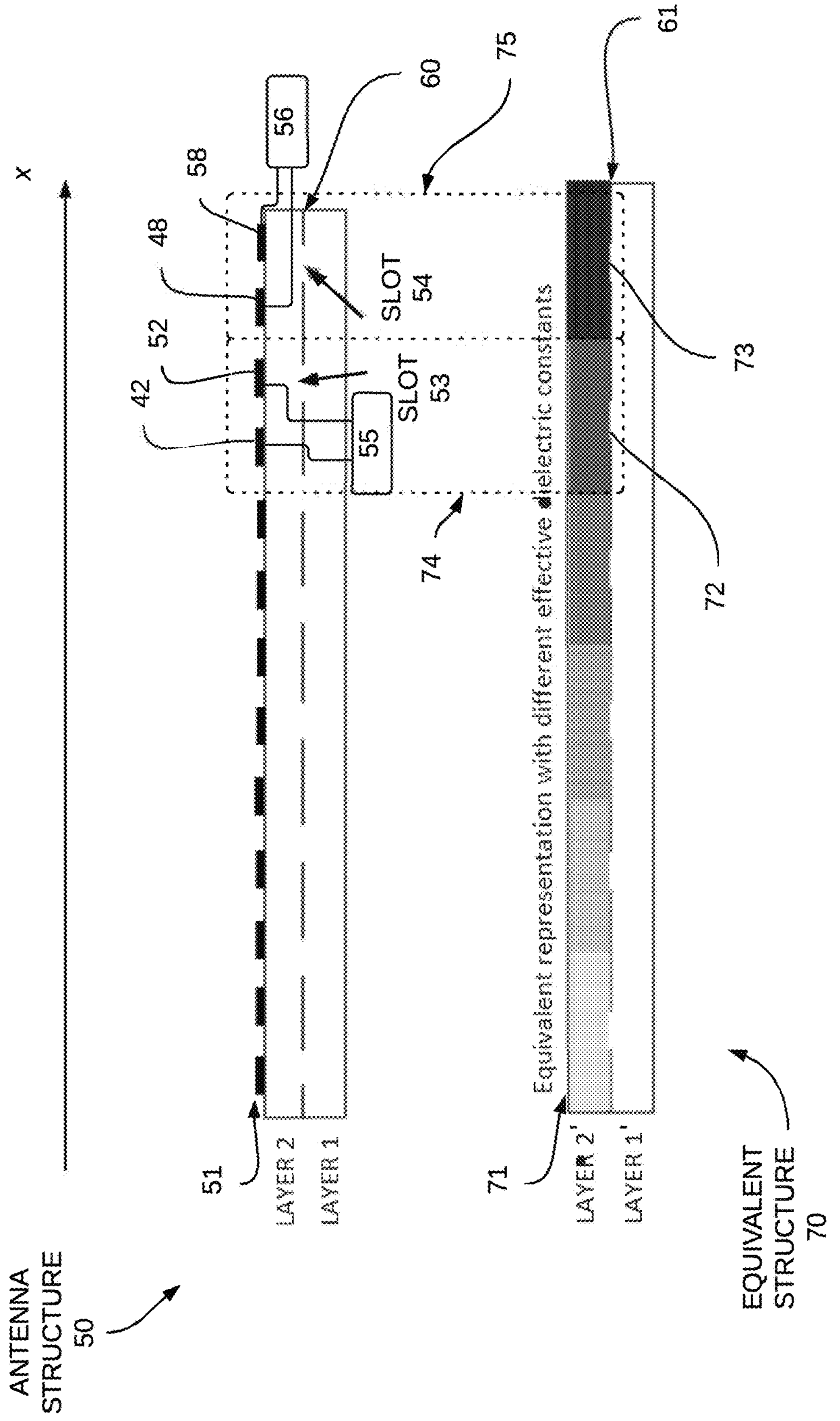
FIG. 3 illustrates antenna structures, according to embodiments of the present invention.
Figure 3:
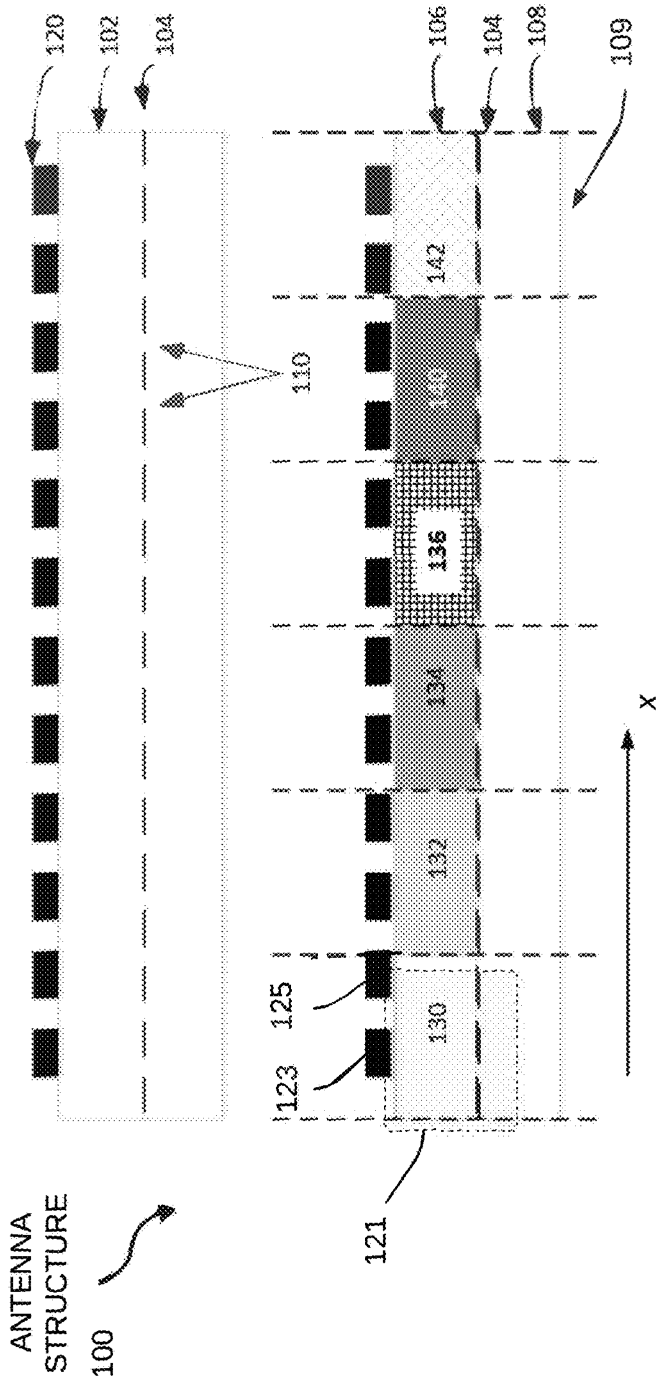

FIG. 3 illustrates an antenna structure 50 having two substrate layers, layer 1 and layer 2, with a conductive layer 60 sandwiched therebetween. There are a plurality of radiating elements 51 positioned on, or within, the layer 2. The layers 1 and 2 are substrates of dielectric material, effectively forming a waveguide structure for EM waves travelling in the x-direction. The conductive layer 60 includes slots formed therein which are discontinuities in the conductive plane of layer 60. The slots are spaced with respect to the positions of the radiating elements 51. At least one of the radiating elements 51 is coupled to a reactance control means. Radiating elements 42, 52 are coupled to reactance control means 55 and radiating elements 48, 58 are coupled to reactance control means 56. The reactance control means 55, 56 may be a same type of control means or may be different structures or circuits. In the present embodiment, the reactance control means 55, 56 are varactor controls coupled to the radiating elements so as to change a reactance of the radiating elements controlled thereby.

Continuing with the example of FIG. 3, the equivalent representation of the antenna structure 50 is given as equivalent structure 70. The representation includes a layer 1', layer 2' and conductive layer 61 to model antenna structure 50. The layer 2' has a plurality of dielectric sections 71, including sections 72, 73, corresponding to sets of radiating elements in antenna structure 50. The correspondence is indicated in dashed lines 74, 75. The organization of antenna structure 50 is drawn to identify the various couplings and connections. Note, the reactance control means 55, 56 may be positioned in a layer proximate layer 2 or may be a separate device coupled to the radiating elements.

The control mechanism 55 controls radiating elements 42, 52 to behave as dielectric 72, having a similar permittivity and dielectric constant. This introduces a phase shift similar to that of an EM signal passing through dielectric 72. The control mechanism 56 controls radiating elements 48, 58 to behave as dielectric 73, having a similar permittivity and dielectric constant. This introduces a phase shift similar to that of an EM signal passing through dielectric 73. The phase shift results in a change in the angle of a beam radiating from the aperture of the antenna structure. For an antenna having multiple super elements made up of multiple radiating elements positioned along a length of a layer, such as layer 1, there may be beam control for each of the super elements. In this way, the reactance control means enable beam steering of signals radiated from the radiating elements. The radiating elements may be MTM, MTS, or other structures for which changes in reactance will change the behavior of the elements.

Figure 4:
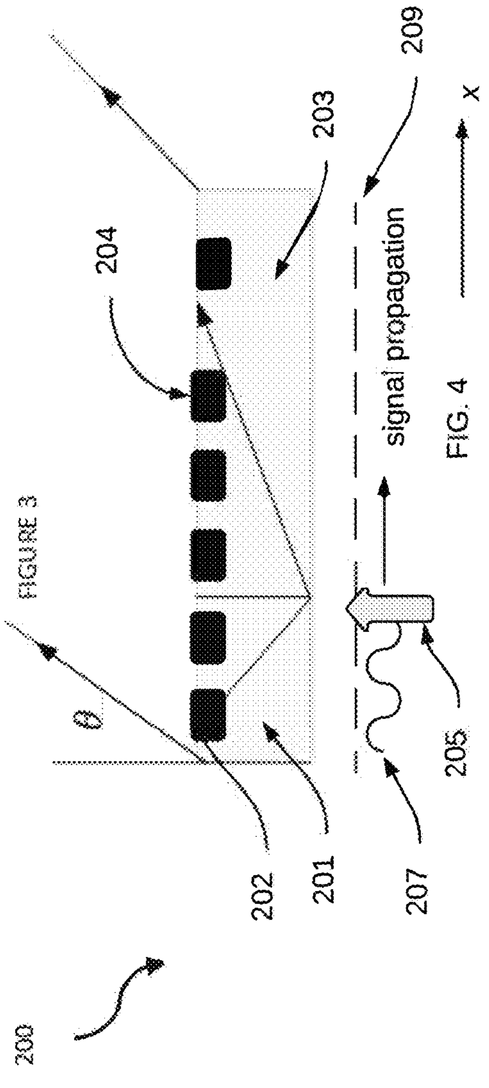
FIG. 4 illustrates substrates having a metamaterial superstrate and metamaterial loading elements, according to embodiments of the present inventions.

FIG. 4 illustrates another embodiment building on the concepts of FIG. 3, implementing dielectric sections in coordination with control of radiating elements. The antenna structure 100 includes a radiating MTM array, having a substrate 102 within which are formed conductive traces 104 separated by gaps 110. The composite substrate provides transmission paths of the feed to the MTM elements 120 formed thereon. Each MTM element 120 is designed and configured to support the specified radiation patterns. The substrate 102 structure acts as a slotted wave guide to feed the radiating elements. The antenna structure of FIG. 4 may be referred to as a Slotted Wave Guide Antenna ("SWGA").

The SWGA includes the following structures and components: a full ground plane, a dielectric substrate, a feed network, such as direct feeds to the multi-ports transceiver chipset, an array of antenna or complementary antenna apertures, such as a slot antenna, to couple the electromagnetic field propagating in the SIW with metamaterial structures located on top of the antenna aperture. The feed network may include passive or active lump components for matching phase control, amplitude tampering, and other RF enhancement functionalities. The distances between the metamaterial structures can be much lower than half wavelength of the radiating frequency of the antenna. Active and passive components can be placed on the metamaterial structures with control signals either routed internally through the SWGA or external through upper portions of the substrate. Metamaterial structures act as an effective medium presenting their own effective permittivity, which implies a dispersive media that adjusts the phase with radiating frequencies. The difference between the effective permittivity of separate sections of the metamaterial superstrate, realizes a different phase shift for each of the metamaterial cells, resulting in a tilted beam.

Alternate embodiments may reconfigure and/or modify the SWGA structure to improve radiation patterns, bandwidth, side lobe levels, and so forth. The SWGA loads the metamaterial structures to achieve the desired results.

The substrate 102 is made of dielectric materials constructed in multiple layers, 106 and 108. The bottom layer 108 is composed of a first material having a first set of dielectric properties. The top layer 106 has multiple sections, illustrated here as dielectric sections 130, 132, 134, 136, 138, 140 and 142, each having a specific effective dielectric constant. Note that alternate embodiments may implement different dielectrics in the layer 108 as well to coordinate with the layer 106. Note that some of the dielectric sections may be composed of a material other than a dielectric, so as to complement the behavior of other dielectric sections.

In the present embodiment, each of the dielectric sections 130-142 is made of a material having a unique dielectric constant, wherein the combination and configurations of the sections is designed to achieve specific results or ranges of results. Alternate embodiments may incorporate configurations that reuse one or more of these specific materials or may use a recurring pattern and so forth. The present inventions may incorporate any number of dielectric sections as determined to achieve the desired results.

A transmission signal propagates through the portions of layer 108 within a super element. The signal radiates through the slots 110 within that super element. The signal radiates through each dielectric portion of layer 106 within the super element. As each dielectric section within layer 106 has different properties, the signal radiating through each dielectric section responds to the transmission signal differently. Signals propagating through the super elements of layer 108 are confined within the super element dimensions and this acts as a wave guide. The radiating signal experiences a phase shift from the signal radiating perpendicular to the direction of the transmission signal propagation, this is referred to herein as boresight with respect to the super element. The phase shift is different for different dielectrics, and therefore for different dielectric sections. As an example, the transmission signals radiating through dielectric section 130 has a first phase shift wherein radiation energy is at a first angle with respect to the radiating element in a first direction with respect to boresight. The transmission signals radiating through dielectric section 132 has a second phase shift wherein radiation energy is at a second angle with respect to boresight. The first and second angles are not the same. These angle differentiations are referred to as tiled beams. The radiation pattern from the antenna structure 100 is a resultant combination of the multiple phase shifted radiation patterns, causing a composite tilted radiation beam.

The present inventions enable beam tilting of the radiation beams through differentiated loading of radiating elements. Where the radiating elements are MTM, this is MTM loading; where the radiating elements are MTS, this is MTS loading. The loading is embedded in the feed structure and dielectric sections supporting the radiating elements.

The antenna performance may be adjusted by design of the SWGA features and materials, such as the shape of the slots, slot patterns, slot dimensions, conductive materials and patterns, dielectric materials, dielectric section configurations, as well as other modifications to achieve impedance matching, phase shifting, beam tilting, and so forth.

The radiating structures 120 are formed proximate the layer 106 of the substrate 102 and effectively form an additional layer acting as an effective medium for transmission.

A dielectric material generally is defined as a material or substance that conducts reduced electricity, and as used herein provides an insulating layer between two conducting layers, such as reference layer 209 of FIG. 4. A common dielectric material is named FR-4, which has specific dielectric properties, including thermal, electrical, chemical and mechanical properties. Thermal properties describe behavior of the material at temperature, such as glass transition temperature, decomposition temperature, coefficient of thermal expansion and thermal conductivity. Each are considered for the application under consideration. Electrical properties include dielectric constant, dielectric loss tangent, volume resistivity, surface resistivity and electrical strength. The dielectric constant is also referred to as relative permittivity and is important for signal integrity, such as in an antenna operation, and impedance considerations. These are particularly important for high-frequency electrical performance. Most Printed Circuit Boards ("PCBs") have a dielectric constant in a range of 2.5 to 4.5. The dielectric constant varies with frequency, and is generally inversely proportional, decreasing with frequency increases. Typically, a material suitable for high frequency applications has a dielectric constant that remains approximately the same over a wide frequency range. Chemical and mechanical properties describe how a given material will respond and behave in various situations and stresses.

Figure 7:
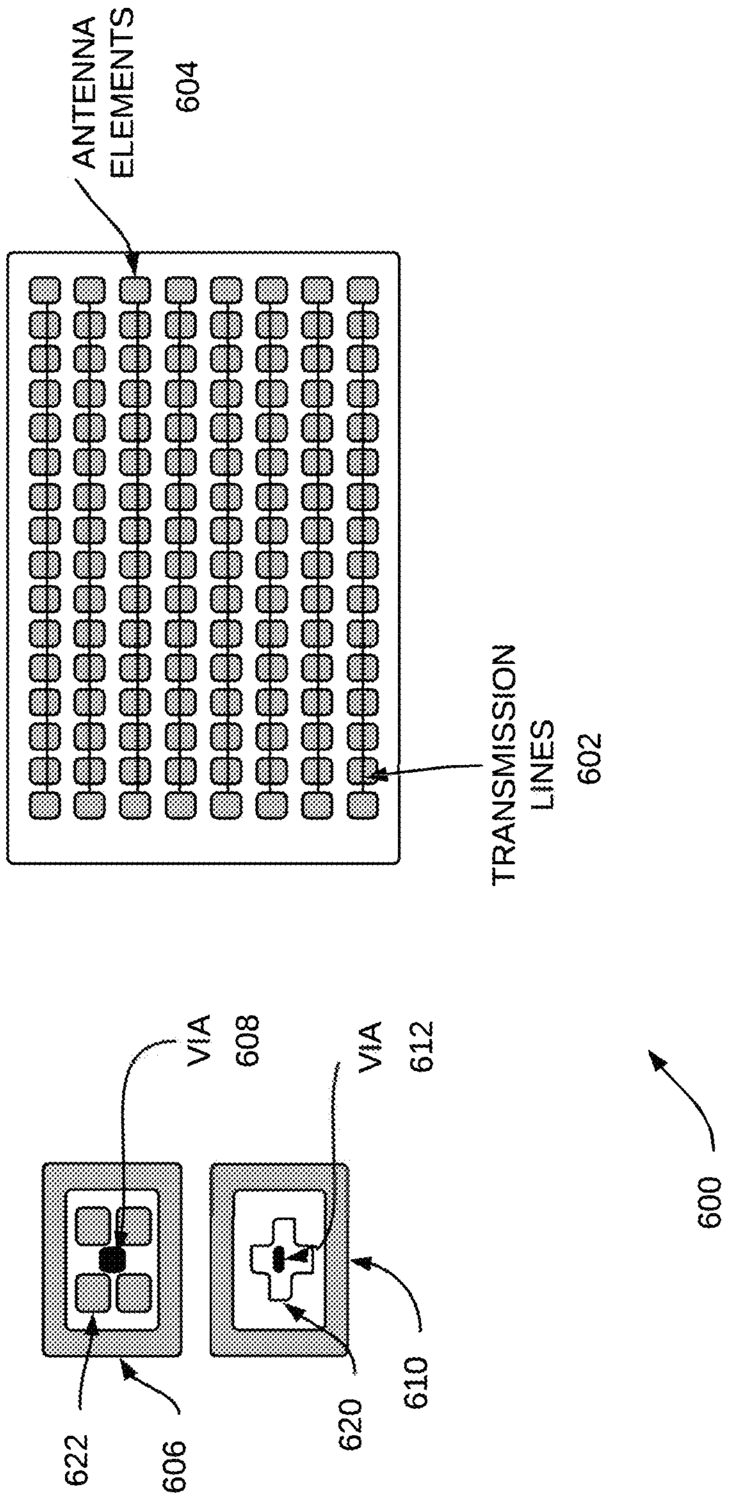
FIG. 7 illustrates another embodiment of an antenna array wherein radiating elements are antenna elements coupled by transmission lines.

The dielectric constant is the relative permittivity of a dielectric material, where the permittivity is expressed in Farad per meter ("F/m"). The dielectric constant is a dimensionless constant that represents the ratio of the material's permittivity compared to the permittivity of a vacuum. When an electromagnetic wave propagates through a dielectric media there may be a change in the amplitude and phase of the signal. For a given material a phase constant or phase coefficient is the imaginary component of a propagation constant of a plane wave, representing change in phase along the path travelled and is proportional to the frequency of the travelling wave. The phase of the electromagnetic ("EM") wave is related to the refractive index of the material. In this way, different dielectric materials having different properties, such as illustrated in FIGS. 3 and 7, will change the phase of the EM wave in different ways.

A slotted wave guide antenna model may be provided on a multi-dielectric layer, wherein the slots may be similarly shaped or may have different shapes to accommodate the behavior of the multi-dielectric layer. This may consider signal radiation, impedance matching, bandwidth and so forth. The first radiation of the EM signal in the waveguide of the antenna structure is through one or more of the slots. Above the slots is another layer supporting meta-structure, metamaterial, patch or other radiating elements. These elements act as an effective medium presenting their own effective permittivity. The difference in the permittivity of separate sections of the radiating elements, referred to as a superstrate, realizes a different phase shift for each radiating element or group of radiating elements. The phase shifts result in a tilted beam from the antenna structure. The array of radiating elements is effectively the aperture of the antenna structure radiating a signal over-the-air. For a MST or MTM radiating element, the effective dielectric constant is varied by biasing an active component, such as a varactor or other control mechanism used to change a behavior of the elements. This realizes an effective reactance in the structure. Different biasing conditions realize different effective dielectric constants, creating a steerable beam along the length of the antenna structure, and specifically, along the length of a super element. The beam may be steered along other dimensions of the array by embedding active elements in a feed structure coupled to the element array.

Consider an embodiment where the radiating elements 120 are MTM elements. Each MTM element is proximate a portion of layer 106 defined as dielectric section 130 composed of a first dielectric. The dielectric section 130 together the MTM elements 123, 125 presents an effective permittivity based on the structure of the MTM elements and the dielectric of dielectric section 130. The combination of a given section, such as dielectric section 130, and the corresponding MTM elements 123, 125 receiving radiations from the dielectric section 130 may be referred to as "MTM superstrate," wherein a portion of the MTM superstrate is section 121. The MTM superstrate 121 includes the section of layer 106 and the corresponding MTM elements 120 and each MTM superstrate is designed to achieve a desired radiating behavior by combination of the sections such as section 121. The difference in the effective permittivity of separate sections 121 of the MTM superstrate enables the antenna to realize a specific (and different) phase shift for each of the metamaterial cells. This results in a "tilted beam."

In addition to the different dielectric materials of sections 130-142, a radiating element 120 has an effective dielectric constant that may be varied by coupling to an active component such as a varactor or other variable control mechanism, where biasing of the active component changes the dielectric constant of the radiating element and the behavior of that element. Specifically, such active component may be used to change the phase of signals radiating from the radiating element. The active component may be coupled to the MTM element at one or multiple locations, thus realizing a change in effective reactance in the structure. The active component may be positioned in the feed network, such as reactance control module 24 of FIG. 2, or may be coupled directly to the coupling element. Various biasing conditions will realize different effective dielectric constants, thus creating a steerable beam. A radiation beam from the antenna structure 100 may be steered along dimensions of the antenna array with active elements embedded in the feed network.

The diagram 200 illustrates the operation of antenna structure 100. Transmission signals 207 propagate through the waveguide (not shown) and radiate through slots 209 into the dielectric sections 201, 203. The dielectric sections 201, 203 tilt the radiated energy at different angles with respect to the normal. When the radiation within dielectric section 201 reaches the radiating elements 202 it radiates with a phase introduced by the radiating element, which is coupled to an active component as described above. Similarly, when the radiation within dielectric section 203 reaches radiating elements 204, it radiates with a phase introduced by the radiating element. The phases of beams radiating from radiating elements 202 and 204 are different. The composite result of the radiations from radiating elements 202, 204 is a tilted beam.

Figure 5:
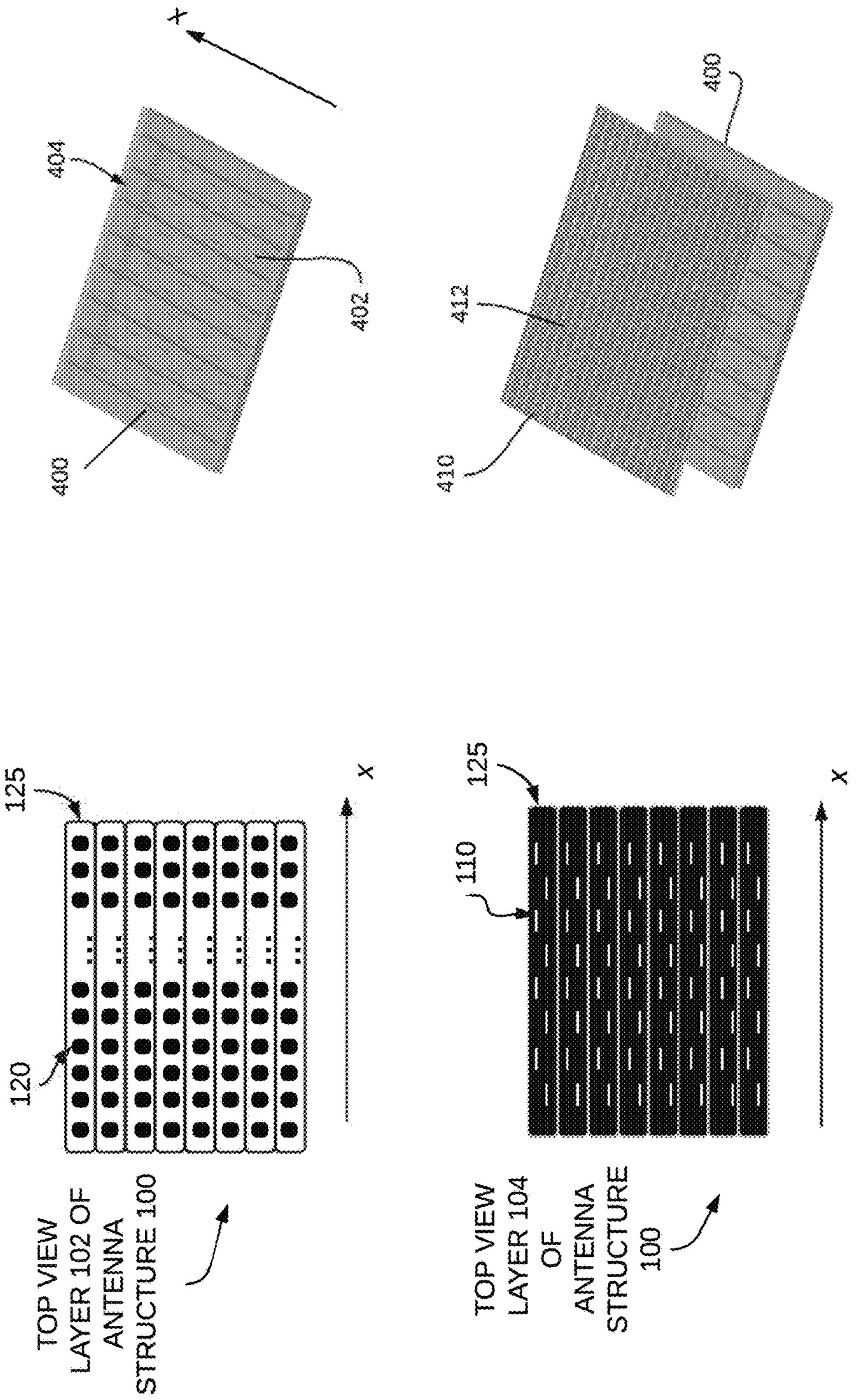
FIG. 5 illustrates configurations of antenna structures, according to embodiments of the present invention.

FIG. 5 illustrates a top-view of the layer 102 where super elements 125 include radiating elements 120. A top-view of layer 104 also illustrates the super elements 125 having slots 110. The length of the antenna structure 100 is indicated by the direction x. FIG. 5 also illustrates a conductive layer 400 with slots 402 configured along super elements 404 in the x-direction. The layer 410 is the antenna array with radiating elements 412. The layers are configured proximate each other.

Figure 6:
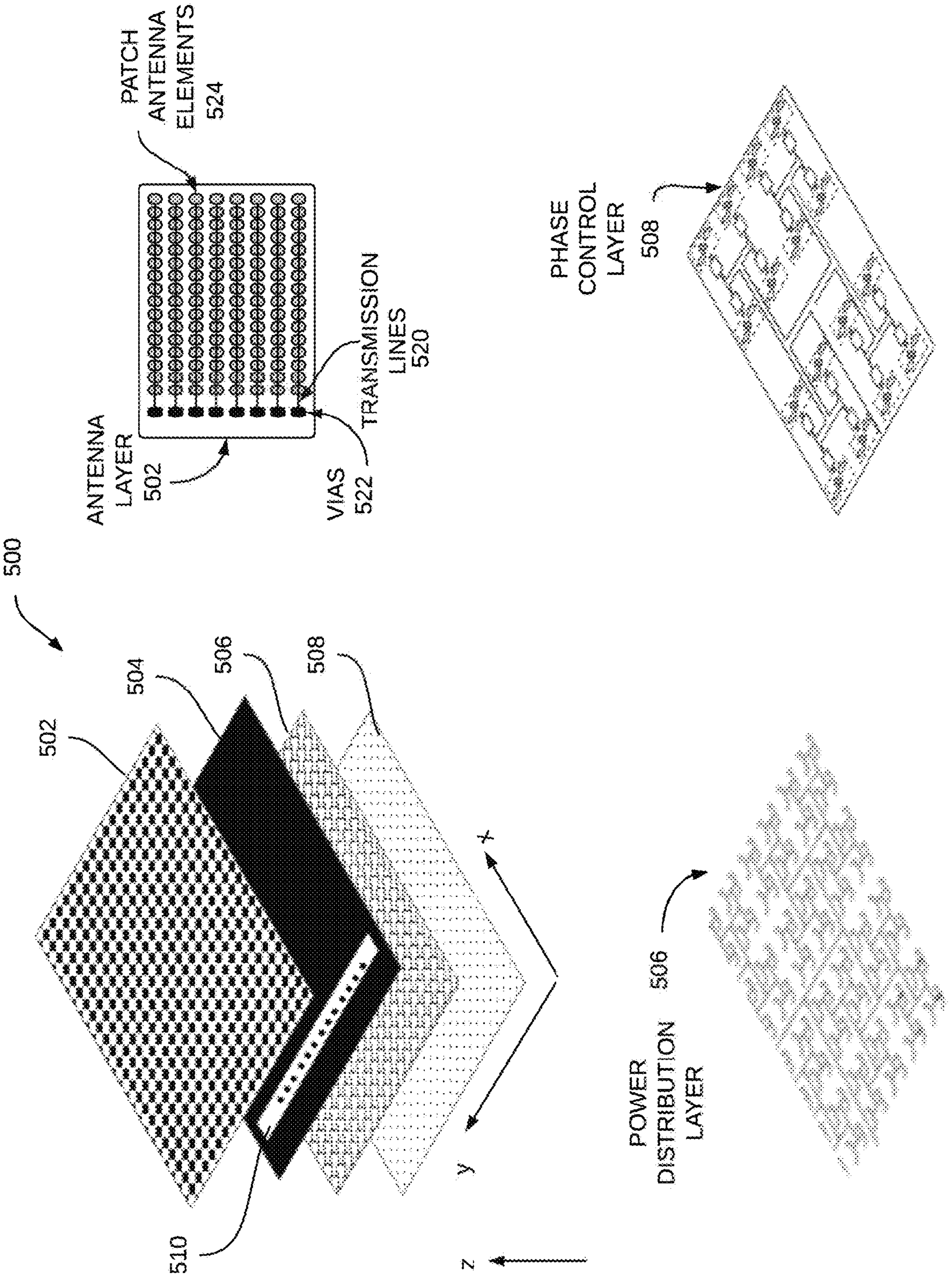
FIG. 6 illustrates an antenna array, corresponding to embodiments of the present invention.

FIG. 6 illustrates a perspective-view of the antenna 500 including the MTS radiating elements configured in a substrate dielectric layer 502. The MTS radiating elements are positioned proximate a slotted conductive layer 504, which is coupled to a power distribution layer 506. The power distribution layer 506 is a feed layer for the antenna structure 500. A phase control layer 508 is then coupled to the structures of the power distribution layer 506. The layers in the antenna structure 500 are referred to herein as "folded layers" as each layer is in an x-y plane and layers are stacked in the z-direction. The phase control mechanisms of phase control layer 508 are coordinated to combine with the power distribution layer 506 paths. The super elements of the slotted conductive layer 504 each have a via at one end to conductively couple each super element to a termination of a path in the power distribution layer 506. The top view of the antenna layer 502 of radiating elements illustrates the super elements as rows of antenna elements 524 as radiating elements where the elements 524 are coupled by conductive lines, transmission lines 520. The vias 522 are positioned at the same end of the plane as the vias 510 of the conductive layer 504. The folded design of FIG. 6 provides a reduced footprint for the antenna structure 500.

FIG. 7 illustrates an alternate embodiment wherein radiating elements are antenna elements 604 coupled by transmission lines 602. The vias in this embodiment are positioned within the antenna elements 604. Note that alternate embodiments may implement the radiating elements as MTM elements or MTS elements and so forth. Examples of positions of vias within a radiating element are illustrated as cell 610 with via 612 positioned within the cell. The cell 606 includes structure 622 and the via 608 is positioned within the cell. The via 608 couples to the power distribution layer and phase control layer. The cell 610 is a cell having conductive portions 620 with a via 612 within the cell 610. The via 612 couples to the power distribution layer and phase control layer.

Figure 8:
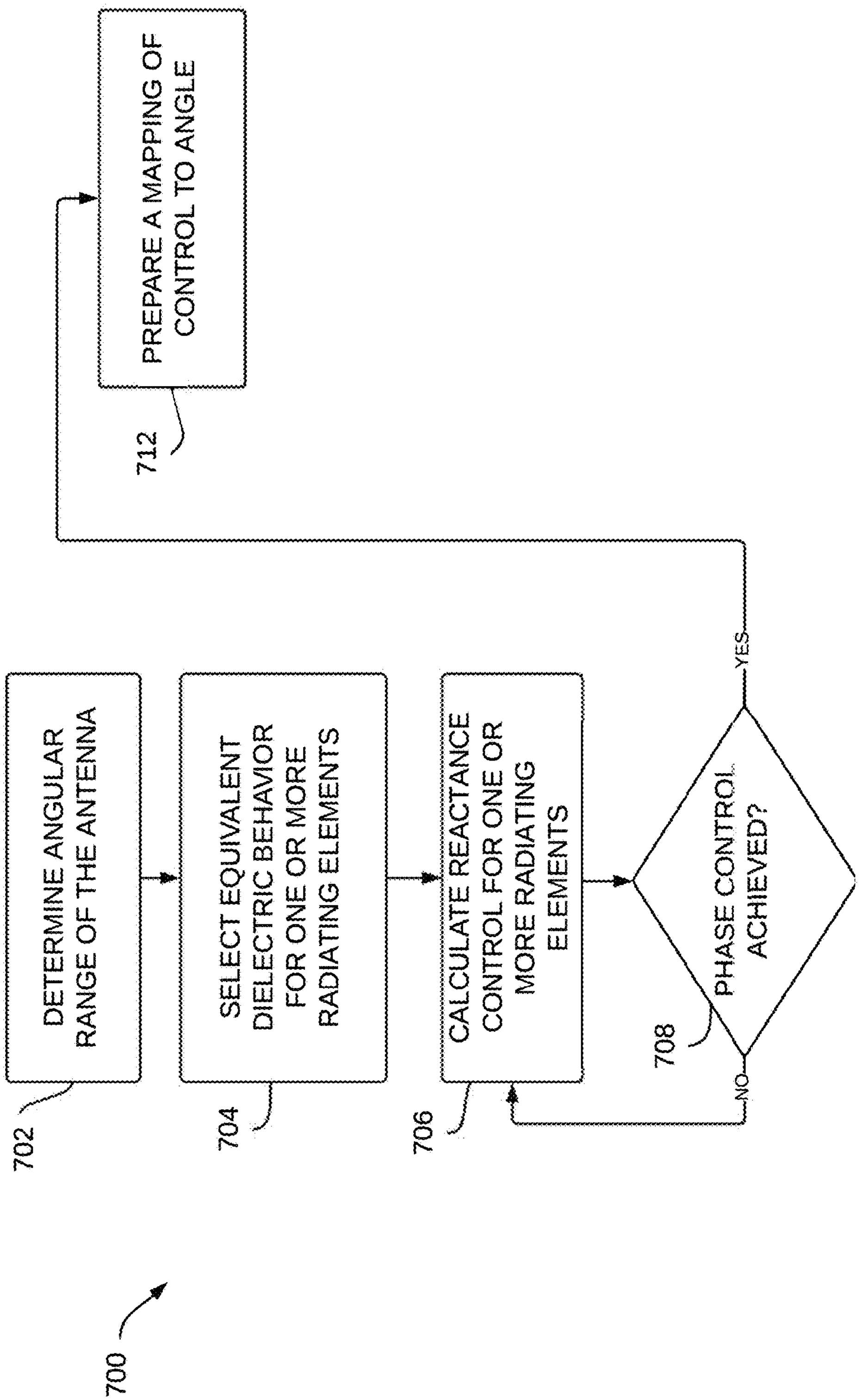
FIG. 8 is a process for designing an antenna structure, according to embodiments of the present invention.

FIG. 8 is a process for designing an antenna structure. The process 700 determines an angular range of the antenna, 702, and selects an equivalent dielectric behavior, 704, for one or more radiating elements. In some embodiments, each radiating element has a corresponding reactance control module and therefore each radiating element will have an equivalent dielectric behavior. The process then calculates a reactance control value for one or more radiating elements, 706. This information may be retrieved from a LUT, such as LUT 1 of FIG. 1, or may be generated and stored in similar structure of memory. The process then determines if the design and control achieve phase control as desired, 708. If not, the process returns to calculate reactance control, 706. If the beam steering is achieved by the phase control, the process prepares a mapping of the reactance control to a resultant angle of the radiation beam, 712. Note that there may be any number of calculations of reactance control for the one or more radiating elements to build a beam-steering scheme sufficient for operation within the angular range of the antenna.

Alternate shapes and configurations may be used in alternate embodiments to build a lattice array of radiating elements as a function of design parameters and desired performance. Reactance control, or phase control, is then achieved through control of the parameters of transmission lines and/or radiating elements.

The apparatus and structures of the present invention may be formed as conductive traces on a substrate having a dielectric layer. The feed structure provides the transmission signal energy to each of the array elements by way of multiple parallel transmission paths. While the same signal is provided to each MTM element, the antenna controller controls the phase of each transmission line and/or each MTM element by a variable reactance element. For example, a varactor control may be a capacitance control array, wherein each of a set of varactor diodes is controlled by an individual reverse bias voltage resulting in an effective capacitance change to at least one individual MTM element. The varactor then controls the phase of the transmission of each MTM element, and together the entire MTM antenna array transmits an electromagnetic radiation beam. Control of reverse bias voltages or other controls of the capacitance control element may incorporate a Digital-to-Analog Converter ("DAC") device. The incorporation of a resonant coupler allows separation of the control or other signals that are used in operation of the apparatus.

The present inventions provide methods and apparatuses for radiating a signal, such as for radar or wireless communications, using a lattice array of radiating elements and a transmission array and a feed structure. The feed structure distributes the transmission signal throughout the transmission array, wherein the transmission signal propagates along the rows of the transmission array and discontinuities are positioned along each row. The discontinuities are positioned to correspond to radiating elements of the lattice array. The radiating elements are coupled to an antenna controller that applies voltages to the radiating elements to change their electromagnetic characteristics. This change may be an effective change in capacitance that acts to shift the phase of the transmission signal. By phase shifting the signal from individual radiating elements, the system forms a specific beam in a specific direction. The resonant coupler keeps the transmission signal isolated and avoids any performance degradation from any of the processing. In some embodiments, the radiating elements are MTM elements. These systems are applicable to radar for autonomous vehicles, drones and communication systems. The radiating elements have a hexagonal shape that is conducive to dense configurations optimizing the use of space and reducing the size of a conventional antenna.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An antenna structure, comprising:

a substrate forming a waveguide structure having a plurality of layers, comprising;

a first dielectric layer;

a second dielectric layer;

a slotted conductive layer positioned between the first and second layers; and an array of radiating elements positioned proximate the second layer, wherein the waveguide structure is configured for propagating electromagnetic waves along the waveguide structure; and a beam-tilting means coupled to the array of radiating elements, adapted to control a reactance of the array of radiating elements to correspond to a plurality of dielectric materials of varying dielectric constants, wherein the waveguide structure is reconfigurable.

2. The antenna structure as in claim 1, wherein the array of radiating elements comprises a plurality of sections corresponding to a plurality of equivalent dielectrics to introduce a different phase shift in the electromagnetic waves.

3. The antenna structure as in claim 2, wherein the beam-tilting means causes the antenna structure to generate a resultant radiation beam tilted from the normal and wherein the beam-tilting means is positioned separate from the antenna structure and coupled to the antenna structure.

4. The antenna structure as in claim 2, wherein the plurality of sections has a pattern of repeating equivalent dielectrics.

5. The antenna structure as in claim 1, wherein the radiating elements are metamaterial unit cells or meta-structure unit cells.

6. The antenna structure as in claim 1, wherein the waveguide structure is a Substrate Integrated Waveguide (SIW).

7. The antenna structure as in claim 1, wherein the first dielectric layer forms a portion of the waveguide structure having a plurality of transmission paths for propagation of a transmission signal comprising the electromagnetic waves.

8. The antenna structure as in claim 7, wherein the slotted conductive layer has slots configured along each of the plurality of transmission paths corresponding to the array of radiating elements.

9. The antenna structure as in claim 7, wherein the plurality of transmission paths are coupled to a power distribution structure.

10. The antenna structure as in claim 9, wherein the beam-tilting means is configured in the power distribution structure as a reactance control module.

11. A method of operating an antenna structure, comprising:

providing a transmission signal to the antenna structure, wherein the antenna structure comprises:

a substrate forming a waveguide structure having a plurality of layers, comprising;

a first dielectric layer;

a second dielectric layer;

a slotted conductive layer positioned between the first and second layers; and an array of radiating elements positioned proximate the second layer, wherein the waveguide structure is configured for propagating electromagnetic waves along the waveguide structure; and a beam-tilting means coupled to the array of radiating elements, adapted to control a reactance of the array of radiating elements to correspond to a plurality of dielectric sections that comprise one or more dielectric materials of varying dielectric constants, wherein the waveguide structure is reconfigurable;

propagating the transmission signal along the waveguide structure of the antenna structure and via one of the dielectric layers of the waveguide structure into the plurality of dielectric sections;

tilting, via the plurality of dielectric sections, a radiated energy at different angles;

radiating, via a plurality of radiating elements, a beam of radiation based on the tilted radiated energy; and reconfiguring the antenna structure to change propagation of radiation beams.

12. The method of claim 11, wherein the array of radiating elements comprises a plurality of equivalent dielectrics that introduces a phase shift in the beam of radiation.

13. The method of claim 11, further comprising mapping a control parameter of the antenna structure to propagation angle.

* * * * *